United States Patent [19]

Sturman et al.

[11] Patent Number: 5,445,182
[45] Date of Patent: Aug. 29, 1995

[54] TOGGLE FLUID CONTROL VALVE

[76] Inventors: Oded E. Sturman, 3973 Santa Monica Ct., Newbury Park, Calif. 91320; Benjamin Grill, 9819 Etiwanda Ave., Northridge, Calif. 91329; Walter L. Harrison, 23554 Cherry St., Newhall, Calif. 91321

[21] Appl. No.: 297,388
[22] Filed: Aug. 11, 1994
[51] Int. Cl.$^6$ .......................................... F16K 11/044
[52] U.S. Cl. ................................. 137/119; 137/625.5
[58] Field of Search ...................... 137/118, 119, 625.5

[56] References Cited

U.S. PATENT DOCUMENTS

| | | | |
|---|---|---|---|
| 3,722,525 | 5/1973 | Epple | 137/199 X |
| 3,811,458 | 5/1974 | Kuhnelt | 137/119 X |

*Primary Examiner*—Robert G. Wilson
*Attorney, Agent, or Firm*—Blakely, Sokoloff, Taylor & Zafman

[57] ABSTRACT

A mechanical control valve that can automatically direct the flow of fluid between two output lines. The control valve has a housing with a fluid inlet, a first outlet and second outlet. The valve also has a poppet that allows fluid to flow out of the first outlet when in a first position and through the second outlet when in a second position. The poppet is normally in contact with a mechanical timing switch. When fluid initially flows into the housing inlet, the poppet directs the fluid to the first outlet. The fluid activates the mechanical timing switch which releases from the poppet. When the fluid no longer flows through the valve, a spring moves the poppet into the second position. At the same time, the mechanical timing switch begins to move back into contact with the popper. An orifice controls the movement of the switch, so that there is a time delay between the moment the fluid pressure in the valve drop, to the point when the poppet is pushed back to the first position. If fluid is reintroduced into the inlet during the time delay, the popper will direct the fluid to the second outlet.

9 Claims, 3 Drawing Sheets

TOGGLE FLUID CONTROL VALVE

BACKGROUND OF THE INVENTION

1. Field of the Invention

The present invention relates to control valves used to control the flow of a fluid.

2. Description of Related Art

Valves are typically used to control the flow of fluid in a pneumatic or hydraulic system. Toggle valves direct the fluid between two output lines, based on the reintroduction of fluid to the valve within a certain time limit. Such valves typically use the working fluid to activate an internal passage valve. The movement of the internal passage valve is controlled by the flow of the working fluid through a pilot hole. The pilot hole can become clogged by foreign matter introduced to the valve by the working fluid. It would therefore be desirable to have a more reliable toggle valve, that is not subject to failure from fluid contamination.

SUMMARY OF THE INVENTION

The present invention is a mechanical control valve that can automatically direct the flow of working fluid between two output lines. The control valve has a housing with a fluid inlet, a first outlet and second outlet. The valve also has a popper that allows fluid to flow out of the first outlet when in a first position and through the second outlet when in a second position. The poppet is normally in contact with a piston that can move within the housing. The piston is connected to a first membrane that is separated from a second membrane by a wall. The wall and membranes define first and second chambers that both expand and contract, when the piston moves within the housing. The wall has an orifice that allows a switch fluid to flow between the chambers at a predetermined flowrate, to control the speed of the piston. The switch fluid is sealed and separated from the working fluid, so that the chambers do not become contaminated.

When fluid initially flows into the housing inlet, the poppet directs the fluid to the first outlet. The fluid also moves the piston, such that the piston becomes separated from the poppet. When the fluid no longer flows through the valve, a spring moves the poppet into the second position. At the same time, the piston begins to move back to engage and move the poppet back to the first position. The orifice controls the movement of the piston, so that there is a time delay between the moment the fluid pressure in the valve drops, to the point when the piston descends back to the original first position. If fluid is reintroduced into the inlet during the time delay, the poppet will direct the fluid to the second outlet. If fluid is reintroduced after the time delay, the descent of the piston will move the poppet back to the first position and the fluid will be directed to the first outlet.

Therefore it is an object of this invention to provide a fluid control valve that can automatically direct fluid to one of either two outlets, without electrical power.

It is also an object of this invention to provide a fluid control valve that has a built in mechanical timer that switches the fluid to a different outlet, if fluid is reintroduced to the valve within a predetermined time.

BRIEF DESCRIPTION OF THE DRAWINGS

The objects and advantages of the present invention will become more readily apparent to those skilled in the art after reviewing the following detailed description and accompanying drawings, wherein.

DETAILED DESCRIPTION OF THE INVENTION

Figure 1:
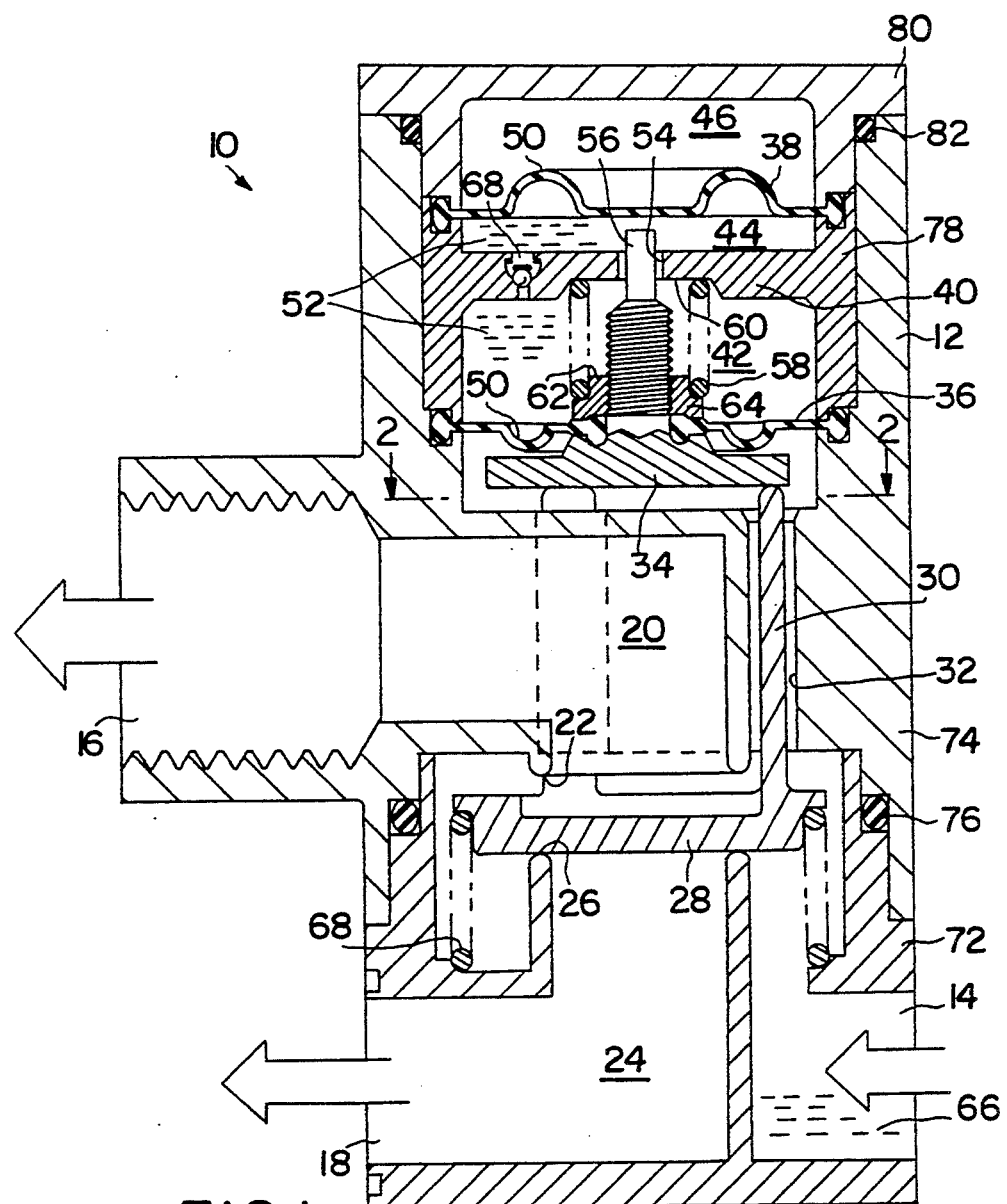
FIG. 1 is a cross-sectional view of a control valve of the present invention in a normal position, wherein the valve is directing fluid to a first outlet.
Figure 2:
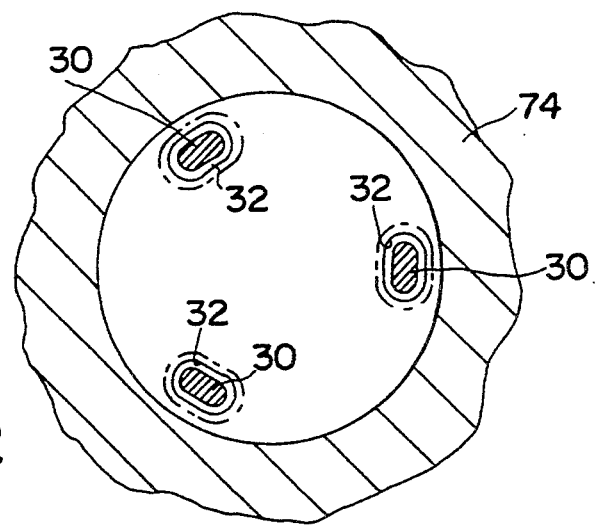
FIG. 2 is a cross-sectional view of FIG. 1, taken at line 2—2.

Referring to the drawings more particularly by reference numbers, FIGS. 1 and 2 show a control valve 10 of the present invention. The valve 10 has a housing 12 with an inlet 14, a first outlet 16 and a second outlet 18. The inlet and outlets are adapted to be connected to fluid lines (not shown). Although only the first outlet 16 is shown with a threaded interface, it is to be understood that the outlets and inlet can all have threaded interfaces, or any other means to allow attachment to external lines or devices. The first outlet 16 has a first passage 20 and a first valve seat 22. The second outlet 18 has a second passage 24 and a second valve seat 26.

Within the housing 12 is a popper 28 which has three arms 30 that extend through three channels 32. The channels 32 are larger than the arms 30 so that fluid may flow through the channels 32. The arms 30 are normally in contact with a piston 34 that is attached to a first membrane 36. The first membrane 36 is separated from a second membrane 38 by a wall 40. The first membrane 36, housing 12 and wall 40 define a first chamber 42. The second membrane 38, housing 12 and wall 40 define a second chamber 44. The second membrane 38 and housing 12 also form a third chamber 46. The third chamber 46 is sealed from the ambient and contains a compressible gas such as air, that allows the second membrane 38 to expand and contract. The membranes 36 and 38, are constructed from flexible material and preferably have folded portions 50, so that the chambers can expand and contract. The chambers 42 and 44, are typically filled with an incompressible fluid 52 such as hydraulic oil or glycol.

The wall 40 has an orifice 54 which allows the fluid 52 to flow between the chambers 42 and 44. The piston 34 may have a stem 56 that extends through the orifice 54. The stem 56 is constructed to allow the piston 34 to move relative to the wall 40, and to further reduce the flow area of the orifice 54. The piston 34 is also connected to a first spring 58 that is seated within a counterbore 60 of the wall 40. The first membrane 36 may be captured by a nut 62 that screws onto the stem 56 of the piston 34. The spring 58 sits on a shoulder 64 of the nut 62. The fluid 52 is sealed from the ambient and the passages 20 and 22, so that the fluid 52 does not become contaminated with foreign matter that could clog the orifice 54 and prevent fluid 52 flow between the chambers 42 and 44.

Figure 3:
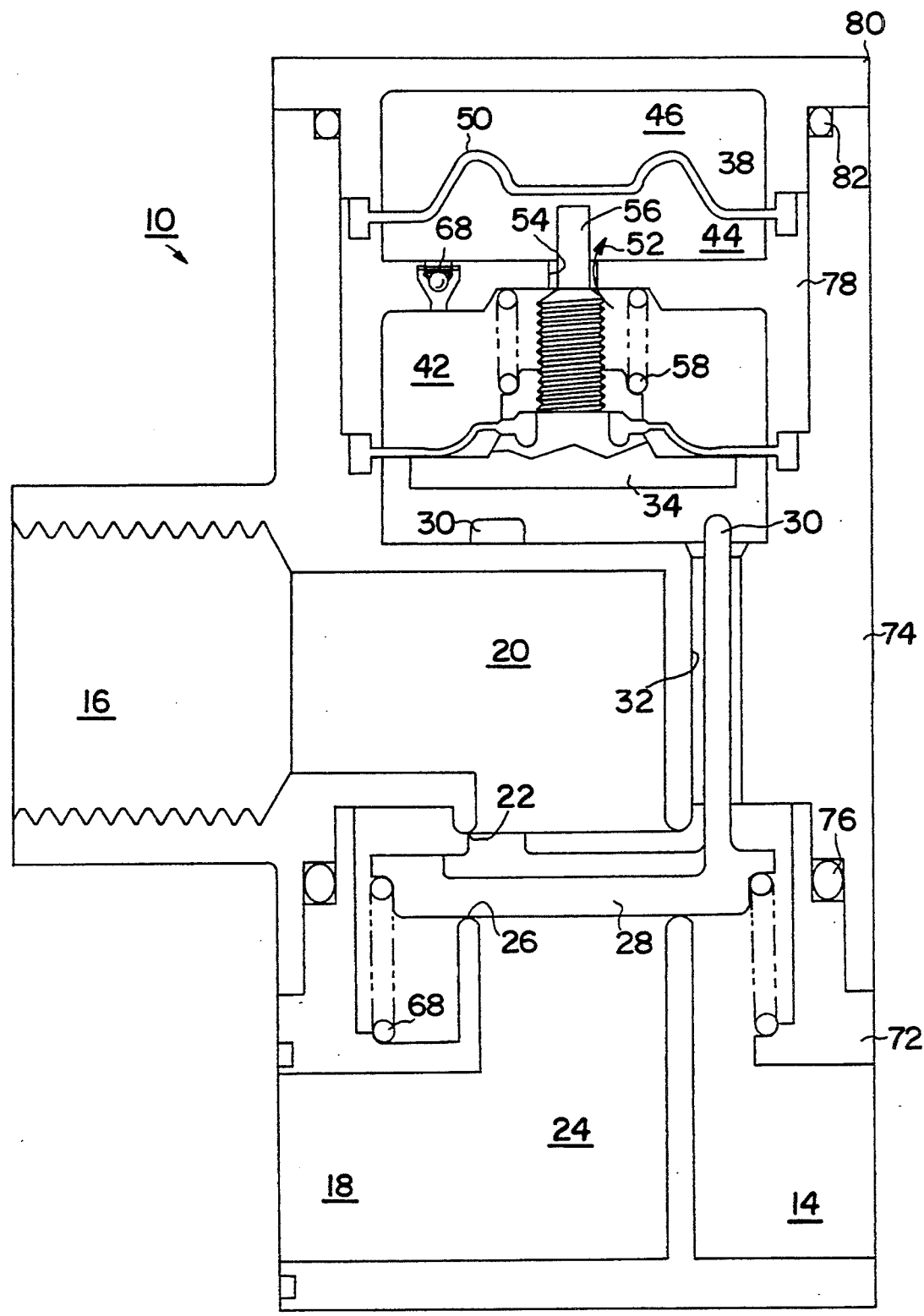
FIG. 3 is a view similar to FIG. 1, showing the control valve after the timer switch has been moved into a switching position.
Figure 4:
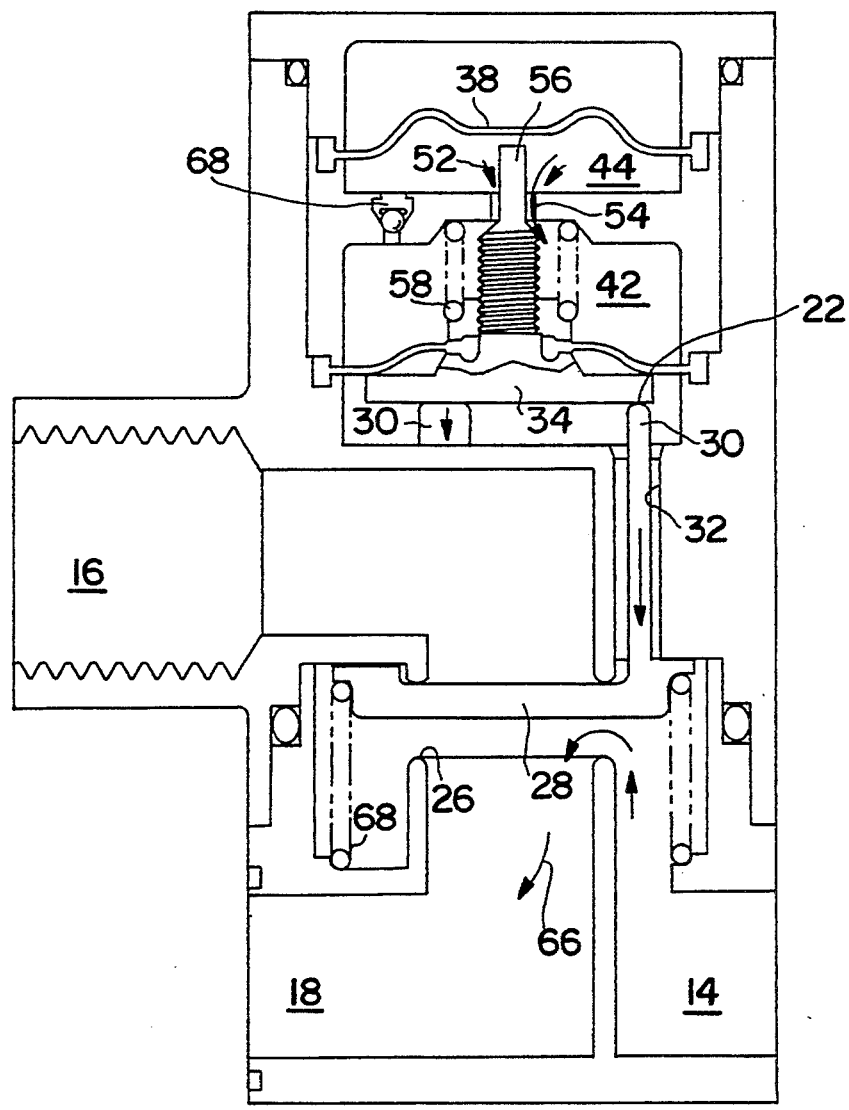
FIG. 4 is a view similar to FIG. 3, showing the control valve directing fluid to a second outlet.

FIGS. 1, 3 and 4 show the operation of the control valve 10. When a working fluid 66 initially flows into the inlet 14, the fluid 66 flows around the poppet 28 and into the first passage 20, as shown in FIG. 1. The pressure of the working fluid 66 presses the poppet 28 against the second seat 26, so that no fluid 66 flows into the second outlet 18.

As shown in FIG. 3, the fluid also flows through the channels 32 to push the piston 34 into a retracted position. The piston 34 movement causes the first chamber 42 to contract, thereby forcing the fluid 52 to flow through the orifice 54 and into the second chamber 44. This fluid flow causes the second chamber 44 and second membrane 38 to expand. The arm 30 and piston 34 become separated as the piston 34 moves and the poppet 28 remains fixed by the pressure of the fluid 66.

As shown in FIG. 4, when the fluid 64 pressure drops to a threshold level (typically zero), a second spring 68 pushes the poppet 28 into a second position, thereby allowing fluid communication between the inlet 14 and the second outlet 18. The popper 28 becomes seated against the first seat 22, so that fluid 66 cannot flow from the inlet 14 to the first outlet 16. At the same time, the force of the first spring 58 and the resiliency of the second membrane 38 force the fluid 52 to flow from the second chamber 44 to the first chamber 42, thereby moving the piston 34 back toward the original position shown in FIG. 1. The flow area between the orifice 54 and the stem 56 is typically quite small, so that there is a time delay between the time when the working fluid 66 pressure drops, to the moment that the piston 34 descends all the way back to its original position.

As an alternate embodiment, the wall 40 may contain a check valve 68 that allows fluid to flow from the first chamber 42 to the second chamber 44. The check valve 68 greatly increases the fluid flow between chambers, to allow the piston 34 to quickly move into the position shown in FIG. 3. The check valve 68 insures that the poppet 28 will open, even when the fluid 66 is first introduced to the valve 10 for only a short interval of time.

If the working fluid 66 is subsequently reintroduced into the inlet 16 (or the pressure is increased to a threshold level) within a certain time limit (typically before the piston 34 reaches its original position), then the poppet 28 will direct the fluid to the second outlet 18. If the fluid 66 is not reintroduced until after the time limit, then the piston 34 will push the poppet 28 back into the first position and the fluid 66 will again be directed to the first outlet 16. The movement of the piston 34 thus acts as a mechanical timer that will allow fluid to be redirected if reintroduced to the valve 10 within a predetermined time limit.

Figure 5:
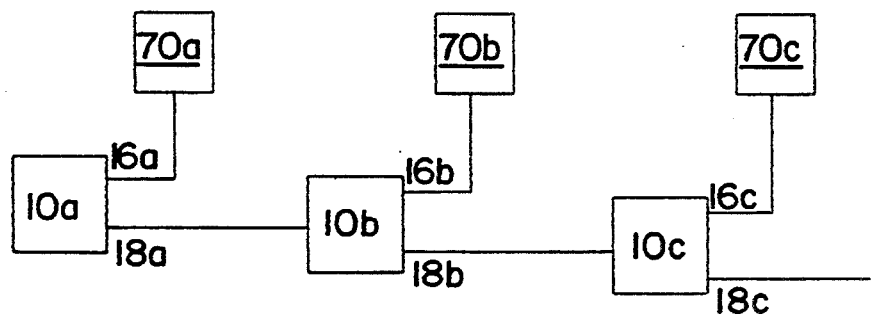
FIG. 5 is a schematic showing three control valves attached to each other and three external devices.

FIG. 5 shows three control valves 10a-c connected to each other and three external devices 70a-c. As by way of example, the devices could be actuators within an automated machine. The first outlets 16a-c are thereby connected to the actuators and the second outlets 18a-c are connected to the next control valve. When fluid is introduced into the first valve 10a, the valve 10a directs the fluid to the first actuator 70a. When the working cycle of the actuator is finished, the fluid pressure is dropped, causing the poppet 28 within the valve 10a to move into the second position. If fluid is reintroduced to the valve 10a within a certain time limit, the valve 10a directs the fluid into the next control valve 10b. The valve 10b then directs the fluid to the second actuator 70b and the process is repeated. Thus what is shown is a hydraulic or pneumatic mechanical control circuit that sequentially powers a series of external devices. The present invention provides the added advantage of automatically resetting the poppets to the first position, when the working fluid no longer flows through the valves. For example, if water flow is interrupted while the valve 10b is directing flow to actuator 70b, the poppets of valves 10a and 10b will both return to the first position. Thus if flow is reintroduced to the system, all the valves will be reset and synchronized, so that the valves will sequentially direct flow to the actuators 70a, 70b and 70c.

In the preferred embodiment, the housing 12 includes a lower body 72 that is connected to an upper body 74 and sealed by a first O-ring 76. Opposite the lower body 74, is a chamber housing 78 that contains the first 36 and second 38 membranes. On top of the chamber housing 78 is a cover 80 that is sealed by a second O-ring 82. The use of the above listed housing parts, greatly simplifies the manufacturing and assembly of the control valve 10.

While certain exemplary embodiments have been described in detail and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A control valve, comprising:
   a housing with an inlet, a first outlet and a second outlet;
   a popper within said housing, said poppet being adapted to be in a first position such that said inlet is in fluid communication with said first outlet, said poppet also being adapted to be in a second position such that said inlet is in fluid communication with said second outlet, said poppet being further adapted to normally be in said first position when working fluid is first introduced into said inlet;
   spring means for moving said poppet into said second position when said working fluid pressure decreases to a first predetermined value; and,
   timing switch means operatively connected to said poppet for moving said popper from said second position to said first position within a predetermined amount of time, said popper will remain in said second position when said working fluid pressure is subsequently increased to a second predetermined value within said predetermined amount of time.

2. The valve as recited in claim 1, wherein said timing switch means includes a first membrane and a second membrane separated by a wall, said first membrane and said wall defining a first chamber and said second membrane and said wall defining a second chamber, said wall having an orifice that allows a fluid to flow between said first and second chambers at a predetermined flowrate, said popper being in operative contact with said first membrane when said first chamber is in an expanded position.

3. The valve as recited in claim 2, wherein said timing switch means further includes a check valve that allows fluid flow from said first chamber to said second chamber.

4. The valve as recited in claim 2, wherein said timing switch means includes a piston attached to said first membrane and in operative contact with said popper when said popper is in said first position, said piston having a stem that extends through said orifice.

5. The valve as recited in claim 2, wherein said timing switch means includes a first spring that biases said first chamber toward said expanded position.

6. The valve as recited in claim 1, wherein said spring means includes a second spring that biases said poppet toward said second position.

7. A control valve, comprising:
   a housing with an inlet, a first outlet and a second outlet;
   a poppet within said housing, said poppet being adapted to be in a first position such that said inlet is in fluid communication with said first outlet, said poppet also being adapted to be in a second position such that said inlet is in fluid communication with said second outlet;
   a first membrane attached to said housing;
   a second membrane attached to said housing;
   a wall that separates said first and second membranes, said wall and said first membrane defining a first chamber, said wall and said second membrane defining a second chamber, said wall having an orifice that allows a fluid to flow between said first and second chambers;
   a piston attached to said first membrane and being in operative contact with said popper when said first chamber is in an expanded position and said poppet in said first position, said piston having a stem that extends through said orifice;
   a first spring connected to said first membrane to bias said first chamber into said expanded position;
   a second spring connected to said poppet to bias said poppet into said second position, so that when a working fluid flows from said inlet to said first outlet, said first chamber is contracted into a retracted position and said fluid flows through said orifice into said second chamber such that said piston is no longer in contact with said popper, when said working fluid decreases to a first predetermined value said second spring pushes said poppet to said second position and said piston pushes said first chamber back toward said expanded position, said popper will remain in said second position when said working fluid pressure is subsequently increased to a second predetermined value within a predetermined amount of time from when said working fluid pressure was decreased to said first predetermined value.

8. The valve as recited in claim 7, wherein said timing switch means further includes a check valve that allows fluid flow from said first chamber to said second chamber.

9. A hydraulic system, comprising:
   a first control valve having;
      a housing with an inlet, a first outlet and a second outlet;
      a popper within said housing, said valve being adapted to be in a first position such that said inlet is in fluid communication with said first outlet, said poppet also being adapted to be in a second position such that said inlet is in fluid communication with said second outlet, said poppet being further adapted to normally be in said first position when working fluid is first introduced into said inlet;
      spring means for moving said poppet into said second position when said working fluid pressure decreases to a first predetermined value;
      timing switch means operatively connected to said poppet for moving said poppet from said second position to said first position within a predetermined amount of time, wherein said popper remains in said second position when said working fluid pressure is subsequently increased to a second predetermined value within said predetermined amount of time;
   a second control valve having;
      a housing with a inlet, a first outlet and a second outlet;
      a poppet within said housing, said valve being adapted to be in a first position such that said inlet is in fluid communication with said first outlet, said poppet also being further adapted to be in a second position such that said inlet is in fluid communication with said second outlet;
      spring means for moving said poppet into said second position when said working fluid pressure decreases to a first predetermined value;
      timing switch means operatively connected to said poppet for moving said popper from said second position to said first position within a predetermined amount of time, wherein said poppet remains in said second position when said working fluid pressure is subsequently increased to a second predetermined value within said predetermined amount of time; and,
   connection means for connecting said inlet of said first control valve to a source of fluid and connecting said second outlet of said first control valve to said inlet of said second control valve.

* * * * *

UNITED STATES PATENT AND TRADEMARK OFFICE
CERTIFICATE OF CORRECTION

PATENT NO. : 5,445,182
DATED : August 29, 1995
INVENTOR(S) : Sturman et al.

It is certified that error appears in the above-identified patent and that said Letters Patent is hereby corrected as shown below:

In [57] Abstract, 15th line, change "with the popper. An" to --with the poppet. An--

In claim 1 in column 4 at lines 28 and 40 change "popper" to --poppet--, each instance;

In claim 2 in column 4 at line 54 change "popper" to --poppet--;

In claim 4 in column 4 at line 63 change "popper" to --poppet--;

In claim 7 in column 5 at lines 22 and 34 change "popper" to --poppet--, each instance;

UNITED STATES PATENT AND TRADEMARK OFFICE
CERTIFICATE OF CORRECTION

PATENT NO. : 5,445,182
DATED : August 29, 1995
INVENTOR(S) : Sturman, et al

It is certified that error appears in the above-indentified patent and that said Letters Patent is hereby corrected as shown below:

In claim 9 in column 6 at lines 5 and 20
change "popper" to --poppet--, each instance.

Signed and Sealed this

Fifth Day of March, 1996

Attest:

BRUCE LEHMAN

Attesting Officer       Commissioner of Patents and Trademarks